A. J. SMITH.
HANDLE FOR UTENSIL COVERS.
APPLICATION FILED FEB. 2, 1911.
1,047,318.
Patented Dec. 17, 1912.
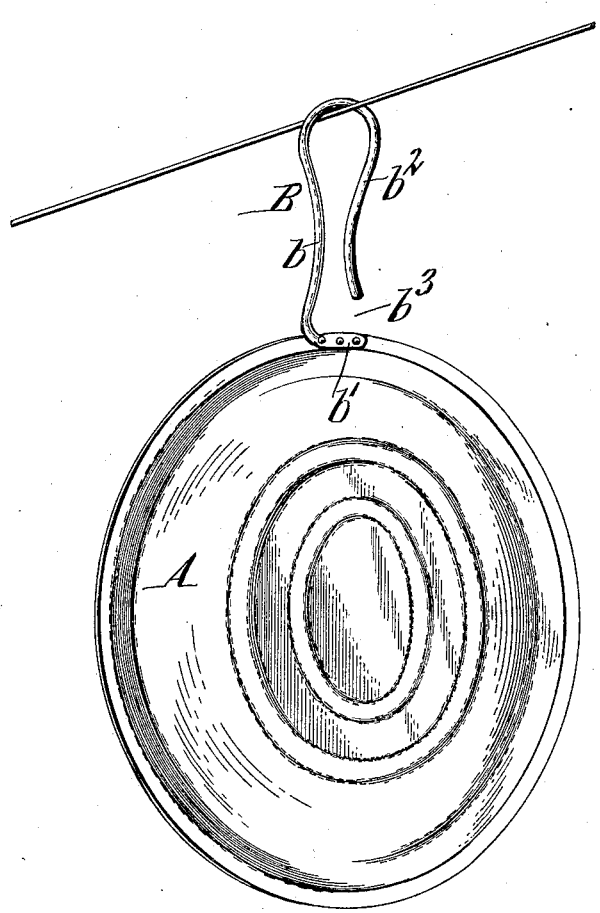

UNITED STATES PATENT OFFICE.

ANNA J. SMITH, OF WOOSTER, OHIO, ASSIGNOR TO THE REPUBLIC METALWARE COMPANY, OF BUFFALO, NEW YORK, A CORPORATION OF NEW YORK.

HANDLE FOR UTENSIL-COVERS.

1,047,318.  Specification of Letters Patent.  Patented Dec. 17, 1912.

Application filed February 2, 1911. Serial No. 606,121.

*To all whom it may concern:*

Be it known that I, ANNA J. SMITH, a citizen of the United States, residing at Wooster, in the county of Wayne and State of Ohio, have invented new and useful Improvements in Handles for Utensil-Covers, of which the following is a specification.

This invention relates to a handle designed more especially for the covers of pots and other cooking utensils. Its object is the provision of a cover-handle which while affording a firm and comfortable grip, also serves as a hanger for suspending the cover from a nail or a supporting rod, wire or cord, thus facilitating the storage of a quantity of such covers in stores and dwellings and permitting the ready removal of one or more of them from the support without disturbing others.

The accompanying drawing is a perspective view of a pot-cover provided with the improved handle.

The cover A shown in the drawing is of the usual circular form. At one side it carries the combined handle and hanger B which is secured to the margin of the cover and projects outwardly therefrom. This handle has the form of an elongated loop and is preferably bent from a single piece of wire of the proper gage to give it the necessary stiffness. One side-bar or member $b$ of the handle is provided at its inner end with an attaching shank $b^1$ which, in the form shown, is bent substantially at right angles thereto and riveted or otherwise secured to the marginal portion of the cover. The other side bar $b^2$ of the handle is not attached directly to the cover but terminates short of the shank $b^1$ and the adjacent edge of the cover to leave an entrance-opening $b^3$ in that side of the handle of sufficient width to permit the handle to be readily passed sidewise over a nail or a supporting rod or wire and likewise removed therefrom without disturbing or interfering with similar covers suspended from the same support. This facilitates the storage of a large number of covers by dealers who can readily remove the particular size desired by a customer. This hanger-feature of the handle also permits compact and convenient storage of a number of such covers in an ordinary kitchen-pantry.

As shown, both side bars $b$, $b^2$ are curved inwardly or concaved symmetrically to form a comfortable handle. As the latter is looplike or of skeleton form, it does not become unduly heated.

It will be noted that the cover and the side bars $b$, $b^2$ and the shank $b^1$ of the handle are all arranged in the same plane, affording the further advantage of permitting close nesting of a number of such covers and compact storage and shipment thereof.

I claim as my invention:

As an article of manufacture, a combined handle and hanger having the form of an elongated loop, one side bar of the loop being provided at its inner end with an attaching shank and the other side bar terminating short of said shank, leaving an entrance-opening in one side of the loop adjacent to the shank, said side bars and said shank being arranged in the same plane.

Witness my hand this 28" day of January, 1911.

ANNA J. SMITH.

Witnesses:
J. J. KENNEY,
ELSIE SMITH.

---

Copies of this patent may be obtained for five cents each, by addressing the "Commissioner of Patents, Washington, D. C."